United States Patent
Siders et al.

(10) Patent No.: US 10,077,714 B2
(45) Date of Patent: Sep. 18, 2018

(54) REPAIRABLE FUEL INJECTOR

(71) Applicant: Rolls-Royce plc, London (GB)

(72) Inventors: Randall D. Siders, West Des Moines, IA (US); Peter J. Schnoebelen, West Des Moines, IA (US); Brandon P. Williams, West Des Moines, IA (US); Neal Thomson, West Des Moines, IA (US); Philip E. O. Buelow, West Des Moines, IA (US); David H. Bretz, West Des Moines, IA (US)

(73) Assignee: Rolls-Royce plc, London (GB)

( * ) Notice: Subject to any disclaimer, the term of this patent is extended or adjusted under 35 U.S.C. 154(b) by 120 days.

(21) Appl. No.: 14/935,004

(22) Filed: Nov. 6, 2015

(65) Prior Publication Data
US 2017/0130652 A1    May 11, 2017

(51) Int. Cl.
*F02C 7/32*    (2006.01)
*F23R 3/14*    (2006.01)
(Continued)

(52) U.S. Cl.
CPC .............. *F02C 7/22* (2013.01); *B23K 33/006* (2013.01); *F23R 3/14* (2013.01); *F23R 3/343* (2013.01)

(58) Field of Classification Search
CPC ...... B23K 33/00; B23K 33/006; B23K 11/14; B23K 1/0018; B23K 2201/001; Y10T 29/49742
See application file for complete search history.

(56) References Cited

U.S. PATENT DOCUMENTS 3,530,667 A * 9/1970 Bryan .................. F23D 11/107
                                                    60/743
5,097,657 A    3/1992 Shekleton et al.
(Continued)

FOREIGN PATENT DOCUMENTS

EP    1811229 A2    7/2007
EP    2241816 A2    10/2010
(Continued)

OTHER PUBLICATIONS

Christensen et al.; "Nickel Brazing Below 1025 C of Untreated Inconel 718"; Oct. 1974; Welding Research Supplement; pp. 460-465.
(Continued)

*Primary Examiner* — Ehud Gartenberg
*Assistant Examiner* — Stephanie Cheng
(74) *Attorney, Agent, or Firm* — Barnes & Thornburg LLP

(57) ABSTRACT

A fuel injector for a lean direct injection fuel nozzle has a pilot air swirler which sits radially outboard of a pilot fuel swirler radially outer wall. The air swirler is bounded on its radially outer side by joined wall portions. One wall portion extends axially and another wall portion converges radially. On the radially inwardly facing surface, the wall portions meet to provide a continuing wall surface of the air swirler which transitions from axial extension to radial convergence over a smooth radius. The curvature of this surface broadly mirrors the radially outwardly facing profile of the pilot fuel swirler radially outer wall. The axially extending wall portion is extended axially to form a first part of a join interface. The radially converging portion is extended in a radial direction to provide a second part of the join interface.

16 Claims, 6 Drawing Sheets

(51) Int. Cl.
    *F23R 3/34*     (2006.01)
    *B23K 33/00*    (2006.01)
    *F02C 7/22*     (2006.01)

(56)        References Cited

U.S. PATENT DOCUMENTS

| | | | |
|---|---|---|---|
| 5,988,531 A | 11/1999 | Maden et al. | |
| 6,269,540 B1 | 8/2001 | Islam et al. | |
| 6,351,948 B1 | 3/2002 | Goeddeke | |
| 6,376,103 B1 | 4/2002 | Sampath et al. | |
| 6,381,842 B2* | 5/2002 | Kato | B23K 15/04 29/888.022 |
| 6,530,227 B1* | 3/2003 | Young | F23D 14/78 60/748 |
| 6,698,208 B2* | 3/2004 | Teets | F23D 11/107 60/740 |
| 7,984,547 B2 | 7/2011 | Steinhardt | |
| 2006/0248898 A1* | 11/2006 | Buelow | F23R 3/14 60/776 |
| 2007/0119052 A1* | 5/2007 | Caldwell | B23P 6/005 29/888.011 |
| 2009/0044538 A1 | 2/2009 | Pelletier et al. | |
| 2010/0263382 A1* | 10/2010 | Mancini | F23R 3/14 60/742 |
| 2011/0052386 A1 | 3/2011 | Schoonover et al. | |
| 2012/0247626 A1 | 10/2012 | Franchet et al. | |
| 2013/0298403 A1 | 11/2013 | Thomson et al. | |
| 2016/0265780 A1* | 9/2016 | Patel | F23R 3/283 |
| 2017/0080530 A1* | 3/2017 | McGhee | B23P 6/005 |

FOREIGN PATENT DOCUMENTS

| | | |
|---|---|---|
| EP | 2375164 A2 | 10/2011 |
| GB | 2355302 A | 4/2001 |
| WO | 0140710 A1 | 6/2001 |
| WO | 2011070302 A1 | 6/2011 |

OTHER PUBLICATIONS

Xue et al. "Laser Cladding of IN-625 Alloy for Repairing Fuel Nozzles for Gas Turbine Engines," Paper #802, Industrial Materials Institute, National Research Council of Canada, Pratt and Whitney Canada, Ontario Canada, 9 pages (2009).
Special Metals; INCONEL alloy 718, publication No. SMC-045, 28 pages (2007).
Donghao Stainless Steel; Chemical Composition of Hastelloy Alloy; hftp://tubingchina.com/Chemical-Composition-of-Hastelloy-Alloy.htm, last visited Dec. 15, 2016.
Tantaline; Chemical Composition of Hastelloy (cited in U.S. Appl. No. 13/470,435 on Oct. 9, 2013.).
Extended European Search Report, European Application No. 16196565.2-1601, dated Mar. 24 2017, 11 pages.

\* cited by examiner

REPAIRABLE FUEL INJECTOR

FIELD OF THE DISCLOSURE

The present disclosure relates to injectors and atomizers, and more particularly to staged fuel injectors for gas turbine engines which can conveniently be repaired without detriment to their performance and their operational life thereby extended.

BACKGROUND OF DISCLOSURE AND RELATED ART

Increased regulation of emissions from gas turbine engines has prompted the development of thermally efficient and reduced emission fuel injectors. It is known that carbon monoxide (CO) and unburned hydrocarbons (UHC) emissions can be reduced with high temperature combustion in the engine. However, high temperature combustion can result in increased production of nitrogen oxides ($NO_X$). This problem has been addressed by injectors which are configured more thoroughly to mix fuel with air prior to combustion with a fuel-to-air ratio below the stoichiometric level. Such arrangements can provide a "lean burn" which results in lower flame temperatures than would occur with stoichiometric burning. Since the production of $NO_X$ is a strong function of temperature, a reduced flame temperature or "lean burn" results in lower levels of $NO_X$.

Staged fuel injection is known to result in reduced engine emissions. In such arrangements, the combustion process is divided into two (or more) zones or stages. These stages are typically physically separate from each other, but close enough to permit interaction. Separation can be axial and/or radial separation. A first, pilot stage is configured to provide fuel for low power operations. In higher power conditions, the pilot continues to provide fuel to the engine and in addition a second, main stage provides the remaining fuel needed for engine operation. In this way, proper fuel-to-air ratios can be controlled for efficient combustion, reduced emissions, and good stability.

Along with staged combustion, pollutant emissions can be reduced by providing a more thoroughly mixed fuel-air mixture prior to combustion wherein the fuel-to-air ratio is below the stoichiometric level so that the combustion occurs at lean conditions. Lean burning results in lower flame temperatures than would occur with stoichiometric burning. Since the production of $NO_X$ is a strong function of temperature, a reduced flame temperature results in lower levels of $NO_X$. The technology of directly injecting liquid fuel into the combustion chamber and enabling rapid mixing with air at lean fuel-to-air ratios is called lean direct injection (LDI).

With an ever increasing demand for higher temperature operability, the heat load on some components of the injector becomes less tolerable and the operational life of the injector limited.

There is a desire to increase the operational life of staged fuel injectors.

STATEMENT OF DISCLOSURE

The disclosure provides a fuel injector for a lean direct injection fuel nozzle, the fuel injector comprising a fuel swirler arranged about an axis and an air swirler arranged coaxial with and radially displaced from the fuel swirler, each of the fuel swirler and air swirler having a circumferentially extending wall comprising an axially extending portion and a portion which converges or diverges radially at a downstream end of the wall towards an outlet, the outlet of the air swirler axially displaced from the outlet of the fuel swirler in a downstream direction, wherein the convergent or divergent portion of the air swirler circumferentially extending wall portion comprises a material different from that of the axially extending wall portion and is joined to the axially extending portion by a molten interface joining method.

In the context of the claim, the terms "upstream" and "downstream" should be understood to refer to the direction of flow of fuel and air through the nozzle, typically this will be the same as the direction of flow of a working fluid passing through a gas turbine engine in which the injector is incorporated.

The fuel injector may comprise a main fuel injector or a pilot fuel injector. The disclosure also provides a lean direct injection fuel nozzle comprising one or more fuel injectors of the disclosure. For example, the lean direct fuel injector nozzle comprises a pilot fuel injector and a main fuel injector both of which are configured in accordance with the disclosure.

In another aspect, the disclosure comprises a gas turbine engine incorporating a lean direct injection fuel nozzle as referred to above.

The inventors have appreciated that the divergent or convergent sections sometimes described as "conics" or "caps" of air swirlers in fuel injectors of a lean direct injection fuel nozzle are subjected to extreme temperatures, for example from recirculating combustion products. This can result in corrosion and/or distortion of the conics. Components of these air swirlers are conventionally manufactured as single walled components. These may be cast to the desired shape, machined from a blank, or alternatively built into the component using an additive layer manufacturing (ALM) method. One option is to manufacture these components from a material with improved high temperature performance, however, such materials are high cost and often difficult to process into complex shapes. The disclosure provides that a higher temperature performance material can be incorporated only in the sections of the swirler most exposed and vulnerable to these extreme temperatures, allowing the remainder of the component to be manufactured from a material which meets the mechanical needs of the remainder of the component is less expensive and more easily processed to provide complex geometries.

Suitable molten interface joining methods are known and include (without limitation) brazing and welding.

In brazing, two surfaces (often of dissimilar material) are aligned either side of a melting and flowing filler metal, the filler metal having a lower melting point than the adjoining metal. The filler metal spreads across the interface between the two surfaces and commences bonding with each surface. On cooling of the filler material at the interface, the two surfaces become joined together. U.S. Pat. No. 7,926,178 (the content of which is incorporated herein by reference) describes a brazing method suitable for use in the manufacture of fuel injectors in accordance with the present disclosure. An advantage of brazing is the ability to join the same or different metals with considerable strength.

Laser welding is a well-known process in which a laser is used to heat surfaces of parts to be welded to melting point. The melting surfaces are then compressed together and allowed to cool. The accuracy of laser heating results in a substantially stress free weld compared to welding with other heat sources. One example (without limitation) of a laser welding process which could be used to join the convergent or divergent portion and the axially extending wall portion included in the circumferentially extending wall portion is laser butt welding.

A further benefit of the disclosure is that, in the event the conic or cap portion becomes damaged, it can relatively easily be replaced by joining a new conic or cap portion without the need to disassemble the entire fuel injector. In another option, repair may be achieved by laser cladding damaged areas of a conic or cap portion. This allows the operating life of the fuel injector to be prolonged. A suitable laser cladding method is described for use in other applications in U.S. Patent App. Pub. No. US2013/0298403 and is incorporated herein by reference.

Geometry in the area where the wall starts to converge/diverge may be adapted to provide a convenient weld interface between the axially extending wall portion and the convergent/divergent wall portion and improve integrity of the joint. Whereas in the prior art the wall of the air swirler remains of substantially constant width as it commences radial convergence/divergence and turns with a gentle curve, more material may be provided in this region in the injector of the disclosure. The geometry of the wall surface which faces a passage of the air swirler desirably remains substantially the same as in the prior art to provide substantially the same air swirling effect. On the opposite wall surface, the region is squared off in part by extension of the axially extending wall portion downstream and additionally by a radial extension from the downstream facing surface of the convergent/divergent wall portion which meets the extension of the axially extending wall portion. This arrangement provides for a circumferential axially extending weld interface. The downstream facing surface of the wall comprising the laser welded axially extending and converging/diverging wall portions thus has a surface profile comprising a radially extending portion and an axially flared portion. This is in contrast to the uniformly radially converging/diverging profile of the prior art arrangement.

The join between the axially extending wall and the radially divergent/convergent wall may be further facilitated by providing a circumferential notch in the extension of the axially extending wall portion. The radially divergent/convergent wall portion is welded into the recess of the notch to provide additional support around the join.

In one specific example, a lean direct injection fuel nozzle in accordance with the disclosure comprises a pilot fuel injector and main fuel injector arranged in a staged configuration, the pilot fuel injector arranged radially inboard of the main fuel injector and the pilot fuel injector comprising a pilot fuel swirler arranged about an axis and a pilot air swirler arranged coaxial with and radially outboard of the pilot fuel swirler, each of the pilot fuel swirler and pilot air swirler having a radially outer wall comprising an axially extending portion and a convergent portion which converges radially at a downstream end of the wall towards an outlet, the outlet of the pilot air swirler axially displaced from the outlet of the pilot fuel swirler in a downstream direction, wherein the convergent portion of the pilot air swirler radially outer wall comprises a material different from the axially extending portion of the pilot air swirler radially outer wall and is joined to the axially extending portion by a molten interface joining method.

In a second specific example a lean direct injection fuel nozzle in accordance with the disclosure comprises a pilot fuel injector and main fuel injector arranged in a staged configuration, the pilot fuel injector arranged radially inboard of the main fuel injector and the main fuel circuit comprising a main fuel swirler arranged about an axis and a main air swirler arranged coaxial with and radially inboard of the main fuel swirler, each of the main fuel swirler and main air swirler having a radially outer wall comprising an axially extending portion and a divergent portion which diverges radially at a downstream end of the wall towards an outlet, the outlet of the main air swirler axially displaced from the outlet of the main fuel swirler in a downstream direction, wherein the divergent portion of the main air swirler radially outer wall comprises a material different from the axially extending portion of the main air swirler radially outer wall and is joined to the axially extending portion by a molten interface joining method.

In another aspect, the disclosure comprises an air swirler sub-assembly suitable for incorporation into a lean direct injection fuel nozzle of the disclosure.

Effusion cooling in gas turbine components (for example turbine blades) is known. Arrays of small cooling holes are provided in a wall of the component. An optimum size and arrangement of holes may be selected to create the boundary layer but minimize risk of blockage by pollutant particles. Cooling air is forced through these small holes and forms a film of cooler boundary layer across a surface of the component. Furthermore, uniform cooling is caused by effusion of the coolant over the entire surface.

To assist in preventing damage caused by recirculating combustion products, effusion cooling holes may be introduced into the air swirler wall in the region of the conic or cap. For example, a circumferential array of elongate slots may be provided passing through the converging or diverging wall portion. The slots may be inclined to an axial and/or radial direction of the swirler to follow swirl direction of air generated upstream in the air swirler. In another example, a circumferential array of substantially circular effusion cooling holes may be provided in the conic or cap adjacent the join with the axially extending wall. The substantially circular holes may be provided in addition to the elongate slots. Other suitable effusion hole shapes and locations will no doubt occur to the skilled addressee without the need for additional inventive thought. Alternative effusion cooling arrangements are not excluded from the scope of the disclosure as claimed.

DETAILED DESCRIPTION OF DRAWINGS

Figure 1:
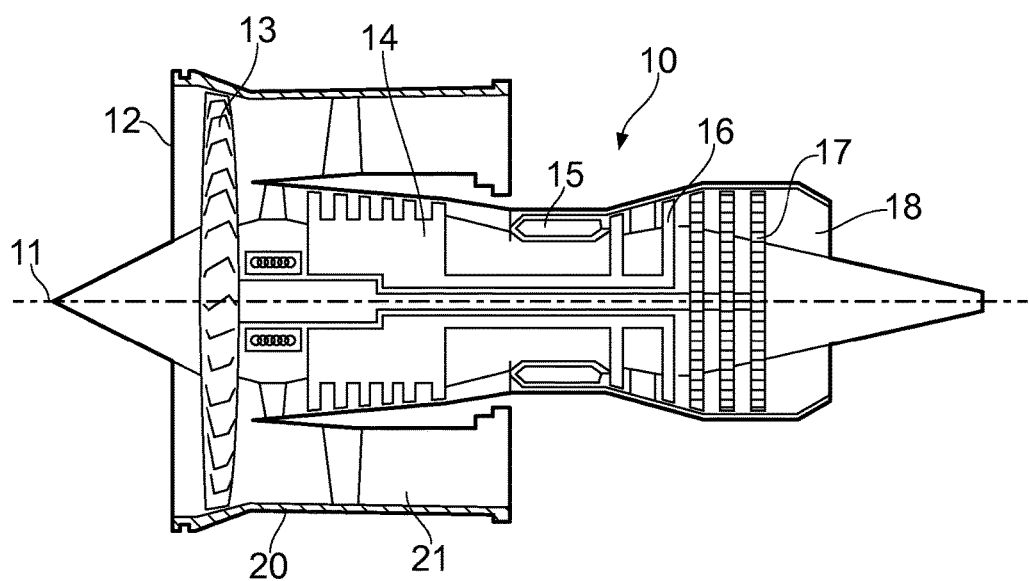
FIG. 1 shows a sectional side view of a gas turbine engine as is known from the prior art.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan. The engine may be configured as a turbojet engine. The disclosure is applicable to any of this variety of engine configurations.

Figure 2:
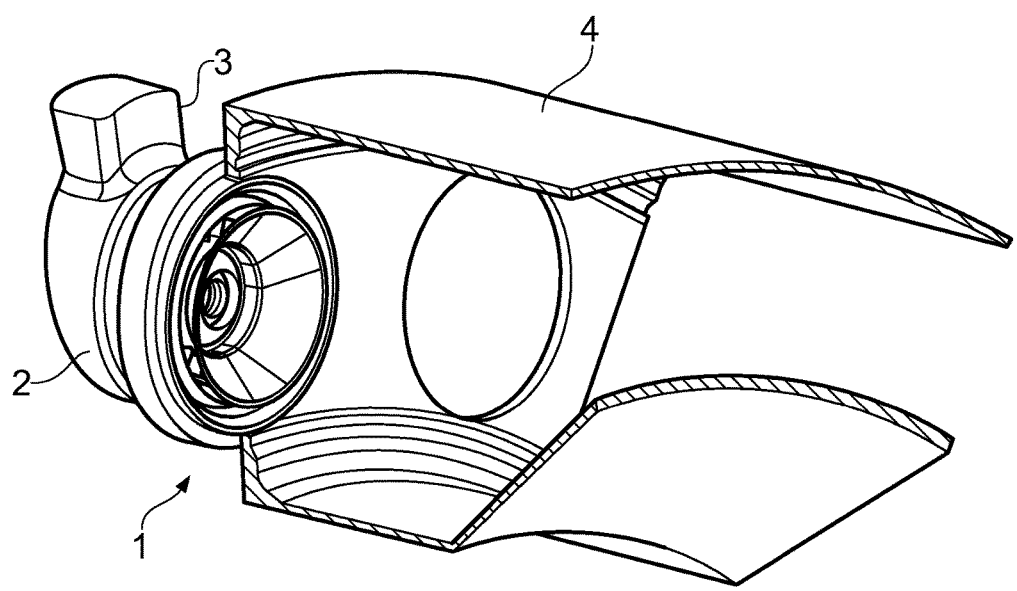
FIG. 2 shows a perspective view of a lean direct injection fuel nozzle as is known from the prior art shown within the combustion chamber of a gas turbine engine.

Within the combustion equipment sits one or more fuel injection nozzles which for example, have the configuration of a lean direct injection fuel nozzle as shown in FIG. 2. FIG. 2 shows a lean direct injection fuel nozzle arranged within a combustion chamber of a gas turbine engine, for example combustion chamber 15 of the gas turbine engine 10 of FIG. 1.

Lean direct injection fuel nozzle 1 is a staged injector configured to provide lean combustion and low pollutant emissions. A pilot fuel delivery system and a main fuel delivery system are integrated into a single fuel nozzle. During high power operation, both the pilot stage and the main stage are fueled, the pilot stage providing good flame stability within the combustion chamber 4. During lower power operation, only the pilot combustion zone is fueled. Combustion is achieved within the combustion chamber 4 in a fuel-lean mode. Typically around 60-70% of the combustion air flows through the injector, the balance of the air used for cooling of combustor components.

A nozzle body 2 issues an atomized fuel/air mixture into the combustion chamber 4. The body 2 depends from an end of an elongated feed arm 3 through which fuel is delivered to the pilot and main injectors.

Figure 3:
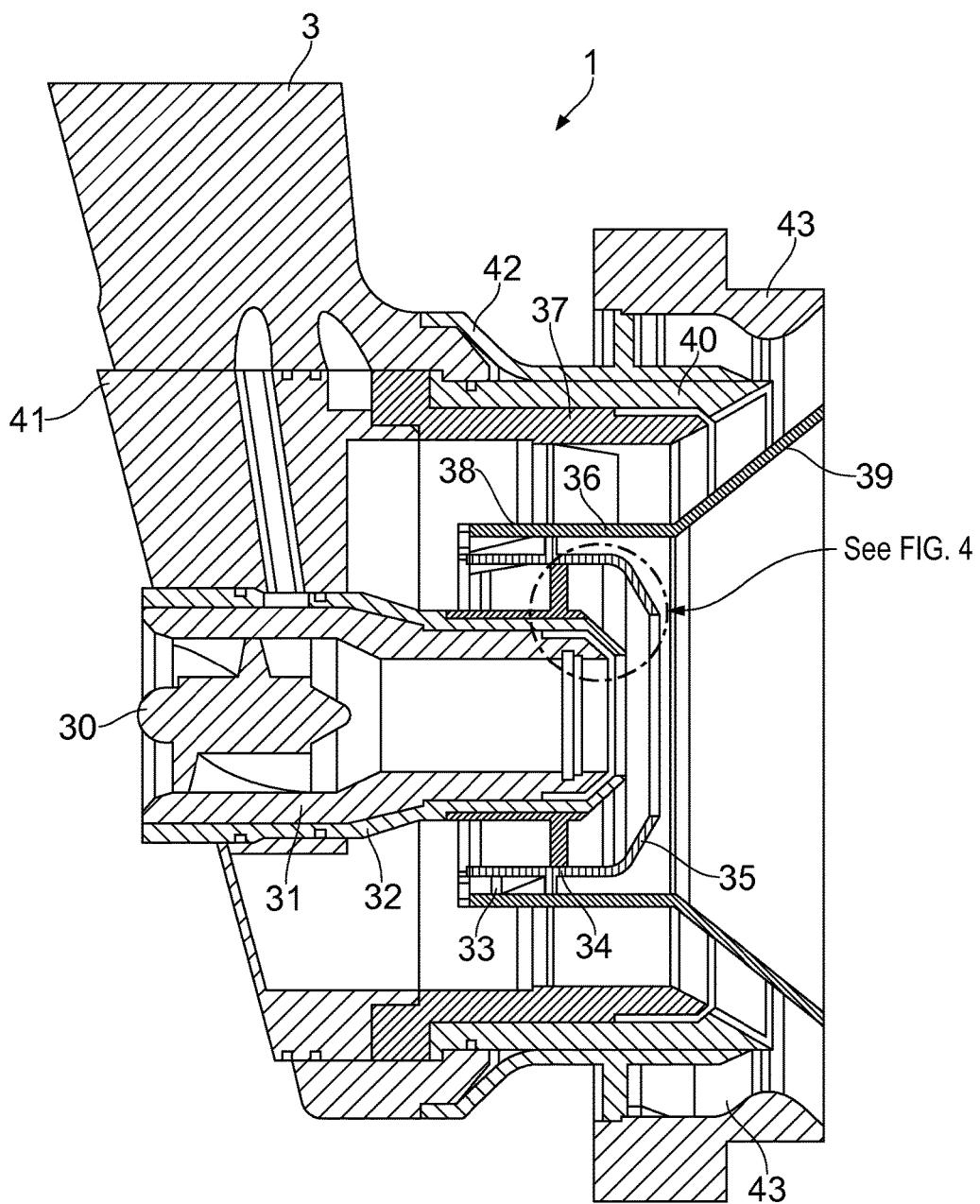
FIG. 3 shows a side elevational view of a direct injection fuel nozzle of the sort shown in FIG. 2.

FIG. 3 shows a section through the lean direct injection fuel nozzle 1. In the arrangement shown, a central air swirler 30 sits on an axis of lean direct injection fuel nozzle 1. A radially outer wall of the swirler 31 defines the radially inner wall of a pilot fuel swirler which is also bounded by pilot fuel swirler wall 32. A second (intermediate) air swirler sits radially outboard of the pilot fuel swirler wall 32 and is bounded by intermediate air swirler wall 33 which has an axially extending portion 34 and a radially converging portion 35. Outboard of the intermediate swirler wall 33 is a main air swirler bounded by radially inner main air swirler wall 36 and radially outer main air swirler wall 37. Radially inner main air swirler wall 36 has an axially extending portion 38 and a radially diverging portion 35. Radially outer main air swirler wall 37 and a radially adjacent wall 40 together define a main fuel swirler. Radially outboard of the main fuel swirler is a second main air swirler defined by walls 42 and 43. A mounting fixture 41 mounts the assembly within the combustor inlet and includes fuel conduits to deliver fuel from the fuel arm to the fuel circuitry in the main and pilot fuel swirlers.

Figure 4:
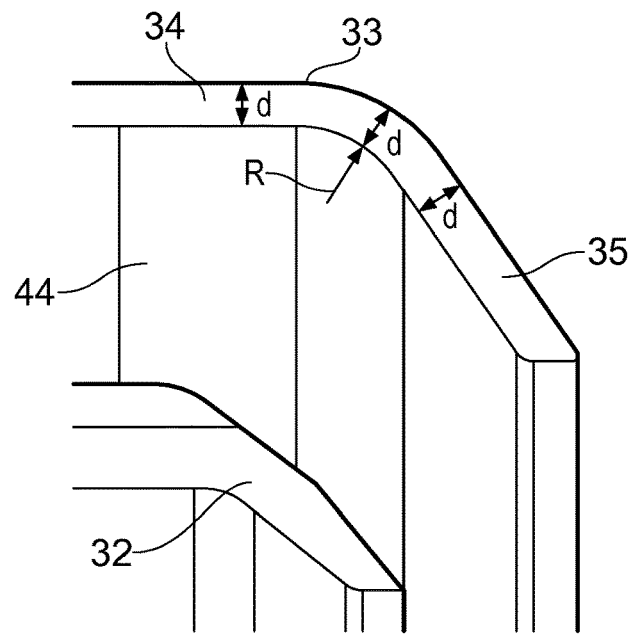
FIG. 4 shows an enlarged view of an encircled section of the lean direct injection fuel nozzle of FIG. 3.

FIG. 4 shows an enlarged view of the circled portion in FIG. 3. FIG. 3 shows the outer wall 32 of the pilot fuel swirler and intermediate air swirler 44 arranged radially outboard thereof. The air swirler 44 is bounded by intermediate swirler wall 33 which has an axially extending portion 34 and a radially converging portion 35. As can be seen the transition from axial extension to radial convergence occurs over a smooth radius R. The wall 33, throughout the wall portions 34, 35 and the transition region maintain a consistent depth d. The wall 33 comprises a single piece of material which optionally is integrally formed with the remainder of the air swirler 44 which, for example, can be built using an ALM or casting process, or a machining process. To maintain uniform flow of air exiting the swirler 44, the curvature of the radially inwardly facing surface of the wall 33 broadly mirrors the radially outwardly facing profile of the pilot fuel swirler radially outer wall 32.

Figure 5:
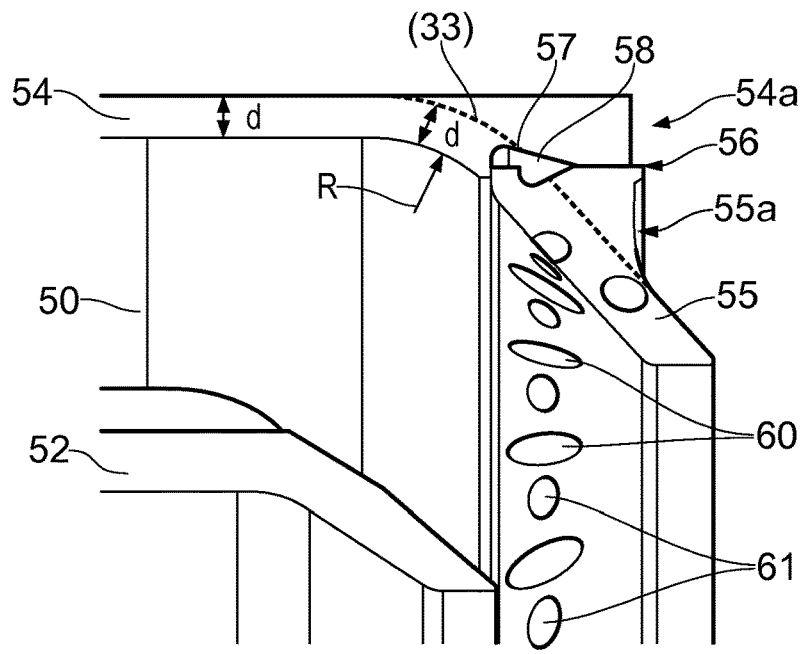
FIG. 5 shows an embodiment of a fuel injector in accordance with the disclosure in the same view as is shown in FIG. 4.

FIG. 5 shows an embodiment of an injector in accordance with the disclosure. The view is similar to that for the prior known arrangement in FIG. 4. The injector of FIG. 5 comprises an inner pilot fuel swirler having radially outer wall 52. Air swirler 50 sits radially outboard of the fuel swirler radially outer wall 52. The air swirler is bounded on its radially outer side by joined wall portions 54 and 55. In common with the prior art arrangement of FIG. 4, wall portion 54 extends axially and wall portion 55 converges radially. On the radially inwardly facing surface wall portions 54 and 55 meet to provide a continuing wall surface of the air swirler 50 which transition from axial extension to radial convergence over a smooth radius R. The curvature of this surface broadly mirrors the radially outwardly facing profile of the pilot fuel swirler radially outer wall 52. It will be seen that the geometry on the radially outwardly facing surface of joined wall portions 54, 55 differs significantly from that of the continuous wall 33 of the prior art arrangement in FIG. 4. For comparison, a dotted line shows the approximate line of the prior art wall 33. Axially extending wall portion 54 is extended axially to form a first part 54a of a join interface 56. Radially converging portion 55 is extended in a radial direction to provide a second part 55a of the join interface 56. Two parts 54a and 54b may be joined, for example, using a laser welding method or a brazing method.

Where the two parts 54a and 55a meet at the weld interface 56, an optional notch 57 is cut into one or both surfaces into which excess braze or weld upset is able to flow. This is expected to provide a concentrically uniform and strong join.

Optional effusion cooling holes are also provided through the converging portion 55. The cooling holes 60,61 have been arranged for cooling both radially outward to join the intermediate flow through an outer row of holes, and radially inward to join the pilot outer swirler 50. In the illustrated embodiment, these are provided in two arrays 60 and 61 which are arranged in axial overlap. A first of the two arrays 60 comprises elongate slots, a second of the two arrays comprises substantially circular effusion holes. Both arrays extend from an axially upstream facing surface of the converging portion 55 to an axially downstream facing surface of the converging portion 55. The outlets of the two arrays may be axially spaced. The axes of the holes in each array may be arranged at different angles to direct cooling flow in different directions. The two rows provide a cooling film over the surface to protect both the conic surface and the conic lip (the diameter). The resulting cooling of the conic is expected to help to reduce stress in the region of the weld as the thermal delta between the main body of the swirler and the conic portion.

Figure 6:
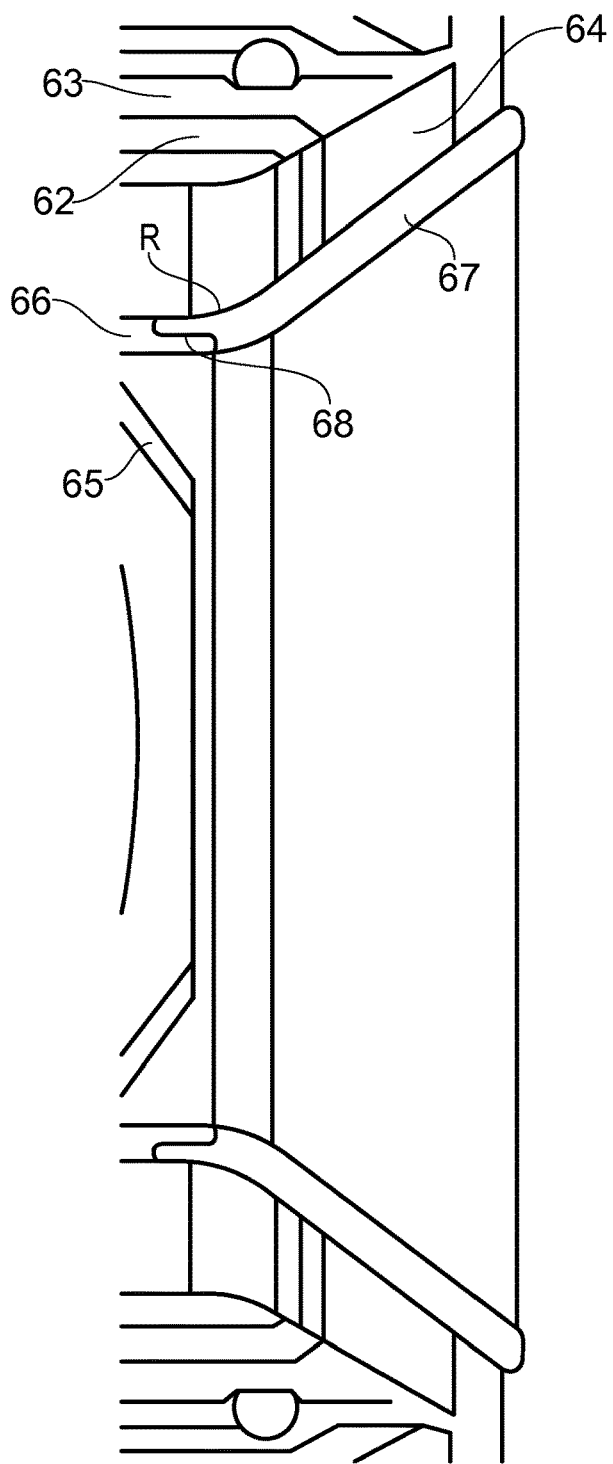
FIG. 6 shows an alternative embodiment of a fuel injector in accordance with the disclosure.

FIG. 6 shows an alternative embodiment of the disclosure. In this figure there is shown a main fuel swirler bounded by axially extending radially inner and outer walls 62, and 63. Radially inboard of the main fuel swirler is an air swirler 64 bounded on a radially inner side by a wall comprising joined wall portions 66 and 67. A first of the wall portions 66 extends axially, a second 67 diverges radially. The joined wall 66, 67 broadly mirrors the radially inwardly facing profile of the main fuel swirler 62, 63. The main fuel injector sits radially outboard and in coaxial alignment with a pilot injector.

The join sits just upstream of a region of smooth radius R where a transition from axial extension to radial divergence commences. As can be seen the geometry of the wall sections 66 and 67 at the join interface 68 is configured to provide a significant axially extending overlap. This results in oppositely facing circumferential recesses adjacent the ends of wall portions 66 and 67 where they are to be joined.

In one example, the wall portions 66 and 67 are joined using a brazing method as set out in U.S. Pat. No. 7,926,178. In another example, the wall portions 66 and 67 may be laser butt welded. It will be understood that the geometry in the region of the join may be adapted similarly to the join in the embodiment of FIG. 5 if a welding joining method is to be used. Equally, in the arrangement in FIG. 5, the geometry of the join could be adapted for brazing and be made similar to the embodiment of FIG. 6.

A radially converging outlet 65 of a pilot air swirler sits in radial alignment with the join. In other embodiments the pilot air swirler may be axially displaced in an upstream direction. The pilot air swirler may be part of a pilot fuel injector having a configuration in accordance with the disclosure.

Figure 7:
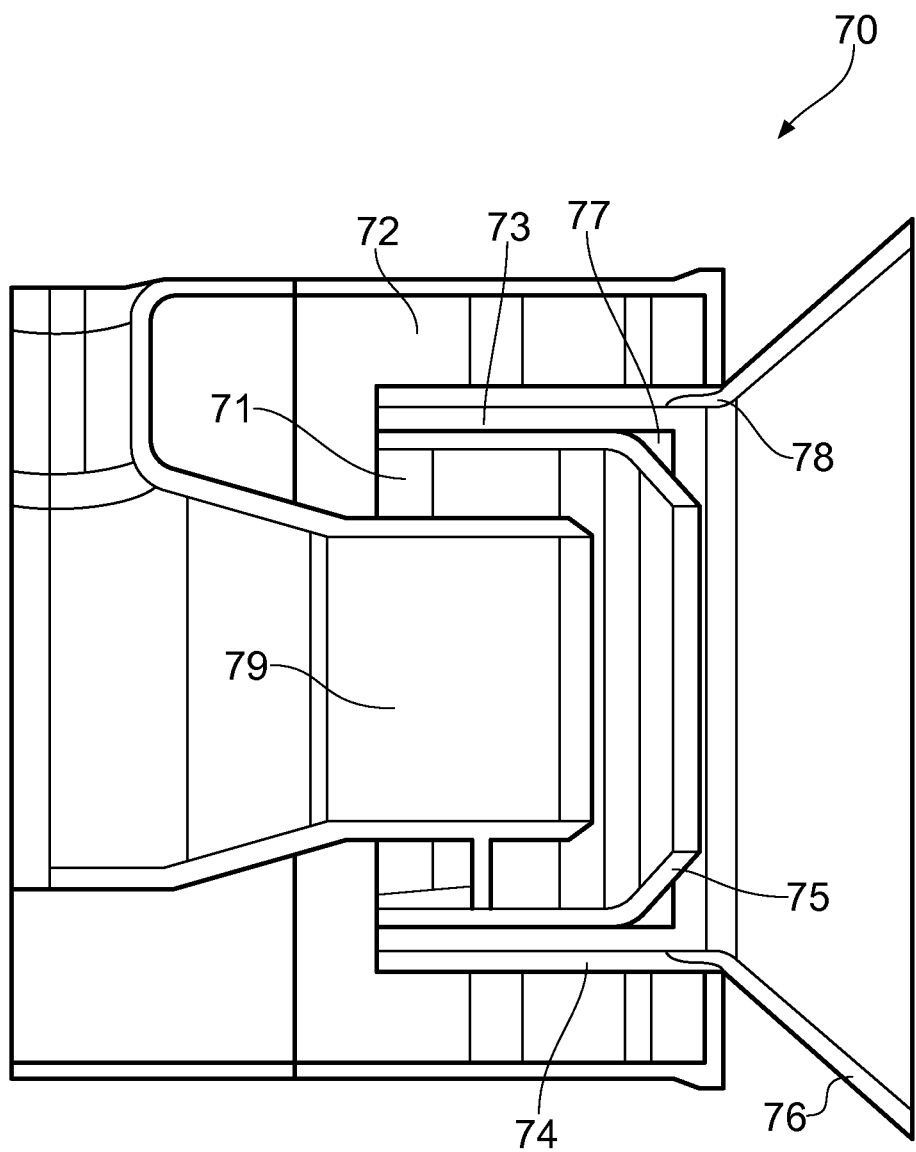
FIG. 7 shows a sub assembly of a lean direct injection fuel nozzle in accordance with the disclosure.

FIG. 7 shows a sub-assembly 70 comprising two co-axially aligned air swirlers 71, 72 suitable for incorporation into a lean direct injector fuel nozzle in accordance with the disclosure. The radially inner swirler 71 has a radially outer wall comprising an axially extending portion 73 and radially converging portion 75. The two portions are welded at a circumferential join 77. The radially outer swirler has a radially inner wall comprising an axially extending portion 74 and a radially diverging portion 76. These two portions are joined at circumferentially extending brazed join 78.

In use the sub-assembly is arranged in the inlet of a combustion chamber. A pilot fuel swirler is provided radially inboard of the sub-assembly and a main fuel swirler radially outboard of the sub-assembly. An inner pilot air swirler may, optionally) also be provided radially inboard of the pilot fuel swirler along an axis of the injector. The sub-assembly may comprise cast components, machined components; components manufactured using an ALM method or any combination of these. The radially converging/diverging wall portions 75, 76 comprise materials with higher thermal performance characteristics than those of the axially extending wall portions 73, 74. These high thermal performance materials serve as a heat shield to components sitting upstream in an engine.

In some embodiments, a fuel injector for a lean direct injection fuel nozzle has a pilot air swirler 50 which sits radially outboard of a pilot fuel swirler radially outer wall 52. The air swirler is bounded on its radially outer side by joined wall portions 54 and 55. The wall portion 54 extends axially and wall portion 55 converges radially. On the radially inwardly facing surface, wall portions 54 and 55 meet to provide a continuing wall surface of the air swirler 50 which transitions from axial extension to radial convergence over a smooth radius R. The curvature of this surface broadly mirrors the radially outwardly facing profile of the pilot fuel swirler radially outer wall 52. Axially extending wall portion 54 is extended axially to form a first part 54a of a join interface 56. Radially converging portion 55 is extended in a radial direction to provide a second part 55a of the join interface 56. The two parts 54a and 54b may be joined, for example, using a laser butt welding method.

The following numbered clauses include embodiments that are contemplated and non-limiting:

Clause 1. A fuel injector for a lean direct injection fuel nozzle, the fuel injector comprising a fuel swirler arranged about an axis and an air swirler arranged coaxial with and radially displaced from the fuel swirler, each of the fuel swirler and air swirler having a circumferentially extending wall comprising an axially extending portion and a portion which converges or diverges radially at a downstream end of the wall towards an outlet, the outlet of the air swirler axially displaced from the outlet of the fuel swirler in a downstream direction, wherein the convergent or divergent portion of the air swirler circumferentially extending wall comprises a material different from that of the axially extending wall portion of the air swirler and is joined to the axially extending wall portion by a molten interface joining method.

Clause 2. The fuel injector of any other clause or combination of clauses, which is a pilot fuel injector and has a radially converging wall portion.

Clause 3. The fuel injector of any other clause or combination of clauses, wherein the axially extending and radially converging/diverging wall portion is adapted to provide a circumferential axially extending weld interface between the axially extending wall portion and the convergent/divergent wall portion and the wall portions are joined at the weld interface using a laser butt weld.

Clause 4. The fuel injector of any other clause or combination of clauses, wherein the fuel injector is a pilot fuel injector having a pilot fuel swirler arranged radially inboard of the air swirler, the air swirler has a radially converging wall portion, and the axially extending wall portion and radially converging wall portion are extended on a radially outer surface to provide opposing faces of the circumferential axially extending weld interface.

Clause 5. The fuel injector of any other clause or combination of clauses, wherein the air swirler is provided with an array of effusion cooling holes which extend from an axially upstream facing surface of the radially converging wall portion to a radially outward facing surface of the axially extending wall portion in the region of the join.

Clause 6. The fuel injector of any other clause or combination of clauses, wherein the effusions cooling holes are round.

Clause 7. The fuel injector of any other clause or combination of clauses, wherein the air swirler is provided with an array of effusion cooling holes which extend from an axially upstream facing surface of the radially converging wall portion to an axially downstream facing surface of the radially converging wall portion in the region of the join.

Clause 8. The fuel injector of any other clause or combination of clauses, wherein the effusion cooling holes are elongate slots.

Clause 9. The fuel injector of any other clause or combination of clauses, wherein the geometry of the wall surface of the air swirler which faces a passage of the air swirler turns with a gentle curve from axial extension to radial convergence/divergence.

Clause 10. The fuel injector of any other clause or combination of clauses, which is a main fuel injector and has a radially divergent wall portion.

Clause 11. The fuel injector of any other clause or combination of clauses, wherein the axially extending and radially diverging wall portion are adapted to provide opposing faces of a circumferential axially extending interface and the wall portions are joined at the interface using a brazing method.

Clause 12. A lean direct injection fuel nozzle comprising one or more fuel injectors, the fuel injectors having a configuration as claimed in any preceding claim.

Clause 13. A gas turbine engine comprising a lean direct injection fuel nozzle of any other clause or combination of clauses.

Clause 14. An air swirler sub-assembly suited to use in a lean direct injection fuel nozzle of any other clause or combination of clauses comprising two co-axially aligned air swirlers; a radially inner swirler having a radially outer wall comprising an axially extending portion and radially converging portion, the axially extending portion and radially converging portion being adapted to provide a circumferential axially extending weld interface between the axially extending wall portion and the radially convergent wall portion, the wall portions being joined at the weld interface using a laser butt weld; and a radially outer air swirler having a radially inner wall comprising an axially extending and a radially diverging wall portion, the axially extending and radially diverging wall portions being adapted to provide opposing faces of a circumferential axially extending interface and the wall portions being joined at the interface using a brazing method.

Clause 15. A lean direct injection fuel nozzle comprising a pilot fuel injector and main fuel injector arranged in a staged configuration, the pilot fuel injector arranged radially inboard of the main fuel injector and the pilot fuel injector comprising a pilot fuel swirler arranged about an axis and a pilot air swirler arranged coaxial with and radially outboard of the pilot fuel swirler, each of the pilot fuel swirler and pilot air swirler having a radially outer wall comprising an axially extending portion and a convergent portion which converges radially at a downstream end of the wall towards an outlet, the outlet of the pilot air swirler axially displaced from the outlet of the pilot fuel swirler in a downstream direction, wherein the convergent portion of the pilot air swirler radially outer wall comprises a material different from the axially extending portion of the pilot air swirler radially outer wall and is joined to the axially extending portion by a molten interface joining method.

Clause 16. A lean direct injection fuel nozzle comprising a pilot fuel injector and main fuel injector arranged in a staged configuration, the pilot fuel injector arranged radially inboard of the main fuel injector and the main fuel injector comprises a main fuel swirler arranged about an axis and a main air swirler arranged coaxial with and radially inboard of the main fuel swirler, each of the main fuel swirler and main air swirler having a radially inner wall comprising an axially extending portion and a divergent portion which diverges radially at a downstream end of the wall towards an outlet, the outlet of the main air swirler axially displaced from the outlet of the main fuel swirler in a downstream direction, wherein the divergent portion of the main air swirler radially inner wall comprises a material different from the axially extending portion of the main air swirler radially inner wall and is joined to the axially extending portion by a molten interface joining method.

Clause 17. A lean direct injection fuel nozzle comprising one or more fuel injectors, the fuel injectors comprising: a fuel swirler arranged about an axis and an air swirler arranged coaxial with and radially displaced from the fuel swirler, each of the fuel swirler and air swirler having a circumferentially extending wall comprising an axially extending portion and a portion which converges or diverges radially at a downstream end of the wall towards an outlet, the outlet of the air swirler axially displaced from the outlet of the fuel swirler in a downstream direction, wherein the convergent or divergent portion of the air swirler circumferentially extending wall comprises a material different from that of the axially extending wall portion of the air swirler and is joined to the axially extending wall portion by a molten interface joining method.

Clause 18. The lean direct injection fuel nozzle of any other clause or combination of clauses, further comprising a gas turbine engine.

Clause 19. The lean direct injection fuel nozzle of any other clause or combination of clauses, further comprising an air swirler sub-assembly, the air swirler sub-assembly including two co-axially aligned air swirlers; a radially inner swirler having a radially outer wall comprising an axially extending portion and radially converging portion, the axially extending portion and radially converging portion being adapted to provide a circumferential axially extending weld interface between the axially extending wall portion and the radially convergent wall portion, the wall portions being joined at the weld interface using a laser butt weld; and a radially outer air swirler having a radially inner wall comprising an axially extending and a radially diverging wall portion, the axially extending and radially diverging wall portions being adapted to provide opposing faces of a circumferential axially extending interface and the wall portions being joined at the interface using a brazing method.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A fuel injector for a lean direct injection fuel nozzle, the fuel injector comprising:
   a fuel swirler arranged about an axis and an air swirler arranged coaxial with and radially displaced from the fuel swirler,
   each of the fuel swirler and air swirler having a circumferentially extending wall comprising an axially extending wall portion and a convergent portion which converges radially at a downstream end of the circumferentially extending wall towards an outlet, the outlet of the air swirler axially displaced from the outlet of the fuel swirler in a downstream direction,
   wherein the convergent portion of the air swirler circumferentially extending wall comprises a material different from that of the axially extending wall portion of the air swirler and is joined to the axially extending wall portion at a weld interface join by a molten interface joining method, and wherein a radially inwardly facing surface of the circumferentially extending wall included in the air swirler transitions from an axial extension to a radial convergence over a radius and the axially extending wall portion included in the air swirler defines at least a first portion of the radial convergence, wherein the convergent portion of the air swirler includes:
a radially inward facing radially convergent surface,
a radially outward facing radially convergent surface,
an interface surface extending parallel with the axis, and
a downstream-facing planar end surface that abuts, and is perpendicular with, the interface surface;
said surfaces extend circumferentially about the axis of the air swirler,
the radially inward facing radially convergent surface defines at least a second portion of the radial convergence downstream of the first portion of the radial convergence of the circumferentially extending wall,
the interface surface extends axially away from the radially inward facing radially convergent surface,
the downstream-facing planar end surface extends radially inward from the interface surface to the radially outward facing radially convergent surface, and
the downstream-facing planar end surface does not form part of the weld interface join between the convergent portion and the axially extending wall portion.

2. The fuel injector as claimed in claim 1 wherein the axially extending wall portion and the convergent portion included in the circumferentially extending wall of the air swirler are adapted to provide the weld interface join therebetween using a laser butt weld.

3. The fuel injector as claimed in claim 2 wherein the fuel injector is a pilot fuel injector having a pilot fuel swirler arranged radially inboard of the air swirler.

4. The fuel injector as claimed in claim 3 wherein the air swirler is provided with a first array of effusion cooling holes which extend from the radially inward facing radially convergent surface to the radially outward facing radially convergent surface.

5. The fuel injector as claimed in claim 4 wherein the first array of effusion cooling holes are round.

6. The fuel injector as claimed in claim 5 wherein the air swirler is provided with a second array of effusion cooling holes which extend from the radially inward facing radially convergent surface to the radially outward facing radially convergent surface.

7. The fuel injector as claimed in claim 6 wherein the second array of effusion cooling holes are elongate slots.

8. The fuel injector as claimed in claim 1 wherein the axially extending wall portion and convergent portion are joined at the weld interface join with a layer of braze material.

9. The fuel injector as claimed in claim 1 wherein the axially extending wall portion and the convergent portion are joined using a laser welding method.

10. The fuel injector as claimed in claim 9 wherein a notch is cut into one or both of the axially extending wall portion and the convergent portion at the weld interface join into which excess weld upset flows.

11. The fuel injector as claimed in claim 1 wherein the axially extending wall portion and the convergent portion are joined using a brazing method.

12. The fuel injector as claimed in claim 11 wherein a notch is cut into one or both of the axially extending wall portion and the convergent portion at the weld interface join into which excess braze flows.

13. The fuel injector as claimed in claim 1 wherein the air swirler is provided with a first array of effusion cooling holes which extend through the radially inward facing radially convergent surface and the downstream-facing planar end surface of the convergent portion.

14. The fuel injector as claimed in claim 1 wherein the axially extending wall portion of the air swirler includes:
an inner surface,
an outer surface,
a downstream-facing planar end surface, and
an interface surface;
said surfaces extend circumferentially about the axis of the air swirler;
the inner surface extends axially and a downstream end of the inner surface defines the first portion of the radial convergence of the circumferentially extending wall,
the outer surface is spaced apart radially from the inner surface,
the downstream-facing planar end surface of the axially extending wall portion extends perpendicular to and radially inward from the outer surface to the convergent portion, and
the interface surface of the axially extending wall portion extends axially downstream from the first portion of the radial convergence of the circumferentially extending wall to the downstream-facing planar end surface of the axially extending wall portion, and the interface surface of the axially extending wall portion faces the interface surface of the convergent portion.

15. A lean direct injection fuel nozzle comprising one or more fuel injectors, each of the one or more fuel injectors comprising:
a fuel swirler arranged about an axis and an air swirler arranged coaxial with and radially displaced from the fuel swirler,
each of the fuel swirler and air swirler having a circumferentially extending wall comprising an axially extending wall portion and a convergent portion which converges radially at a downstream end of the circumferentially extending wall towards an outlet,
the outlet of the air swirler axially displaced from the outlet of the fuel swirler in a downstream direction,
wherein the convergent portion of the air swirler circumferentially extending wall comprises a material comprising a thermal performance characteristic which is different from that of the axially extending wall portion of the air swirler and is joined to the axially extending wall portion at a molten interface join by a molten interface joining method, and wherein a radially inwardly facing surface of the circumferentially extending wall included in the air swirler transitions from an axial extension to a radial convergence and at least a portion of the axially extending wall portion of the air swirler defines at least a first portion of the radial convergence, wherein the convergent portion of the air swirler includes:
a radially inward facing radially convergent surface,
a radially outward facing radially convergent surface,
an interface surface extending parallel with the axis, and
a downstream-facing planar end surface that abuts, and is perpendicular with, the interface surface;
said surfaces extend circumferentially about the axis,
the radially inward facing radially convergent surface defines at least a second portion of the radial convergence downstream of the first portion defined by the axially extending wall portion,
the interface surface extends axially away from the radially inward facing radially convergent surface, the downstream-facing planar end surface extends radially inward from the interface surface to the radially outward facing radially convergent surface, and the downstream-facing planar end surface does not form part of the molten interface join between the convergent portion and the axially extending wall portion.

16. A lean direct injection fuel nozzle comprising:

a pilot fuel injector and main fuel injector arranged in a staged configuration, the pilot fuel injector arranged radially inboard of the main fuel injector and the pilot fuel injector comprising a pilot fuel swirler arranged about an axis and a pilot air swirler arranged coaxial with and radially outboard of the pilot fuel swirler, each of the pilot fuel swirler and pilot air swirler having a circumferentially extending outer wall comprising an axially extending portion and a convergent portion which converges radially at a downstream end of the circumferentially extending outer wall towards an outlet, the outlet of the pilot air swirler axially displaced from the outlet of the pilot fuel swirler in a downstream direction, wherein the convergent portion of the pilot air swirler circumferentially extending outer wall comprises a material comprising a thermal performance characteristic which is different from the axially extending portion of the pilot air swirler circumferentially extending outer wall and is joined to the axially extending portion at a molten interface join by a molten interface joining method, and wherein a radially inwardly facing surface of the circumferentially extending outer wall included in the pilot air swirler transitions from an axial extension to a radial convergence and at least a portion of the axially extending portion of the pilot air swirler defines at least a first portion of the radial convergence, wherein the convergent portion of the pilot air swirler includes:

a radially inward facing radially convergent surface, a radially outward facing radially convergent surface, an interface surface extending parallel with the axis, and a downstream-facing planar end surface that abuts, and is perpendicular with, the interface surface;

said surfaces extend circumferentially about the axis, the radially inward facing radially convergent surface defines at least a second portion of the radial convergence downstream of the first portion defined by the axially extending portion, the interface surface extends axially away from the radially inward facing radially convergent surface, the downstream-facing planar end surface extends radially inward from the interface surface to the radially outward facing radially convergent surface, and the downstream-facing planar end surface does not form part of the molten interface join between the convergent portion and the axially extending portion.

* * * * *